US011421790B2

(12) United States Patent
Lee et al.

(10) Patent No.: US 11,421,790 B2
(45) Date of Patent: Aug. 23, 2022

(54) BALLSTAT FLOW DIVERTER

(71) Applicant: ILLINOIS TOOL WORKS INC., Glenview, IL (US)

(72) Inventors: Chaemoon Lee, Chicago, IL (US); Joseph Davis, Archbold, OH (US); Jason Trotter, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/011,498

(22) Filed: Sep. 3, 2020

(65) Prior Publication Data

US 2021/0071765 A1    Mar. 11, 2021

Related U.S. Application Data

(60) Provisional application No. 62/896,800, filed on Sep. 6, 2019, provisional application No. 62/954,066, filed on Dec. 27, 2019.

(51) Int. Cl.
*F16K 11/08* (2006.01)
*F16K 5/06* (2006.01)
(Continued)

(52) U.S. Cl.
CPC ........ *F16K 5/0605* (2013.01); *F16K 11/0876* (2013.01); *F01P 2007/146* (2013.01);
(Continued)

(58) Field of Classification Search
CPC ............... F16K 11/0873; F16K 31/002; F16K 27/04–067; F16K 31/5284; F16K 11/0876; F16K 11/076; F16K 5/0647; F16K 5/0605; F16K 3/04; F16K 41/046; F16K 41/066; F16K 41/086; F01P 2007/146; Y10T 137/7737; Y10T 137/86863;
(Continued)

(56) References Cited

U.S. PATENT DOCUMENTS

| | | | | |
|---|---|---|---|---|
| 4,147,139 A | * | 4/1979 | Hass ..................... | F01P 7/16 123/41.1 |
| 4,679,530 A | * | 7/1987 | Kuze ..................... | F01P 7/16 123/41.1 |
| 6,742,716 B1 | * | 6/2004 | Duprez ............... | G05D 23/022 236/34.5 |
| 7,727,974 B2 | * | 6/2010 | Kawano ................ | A61K 47/26 514/53 |

(Continued)

FOREIGN PATENT DOCUMENTS

| | | |
|---|---|---|
| EP | 2052177 B1 | 8/2011 |
| WO | 2020018340 A1 | 1/2020 |

*Primary Examiner* — Craig J Price
(74) *Attorney, Agent, or Firm* — Quarles & Brady LLP

(57) ABSTRACT

A coolant control ball valve assembly comprises a housing that includes a housing chamber. The coolant control ball valve assembly further comprises a channel and a plurality of ports that extend from the housing chamber, and a valve element positioned in line with the channel and the plurality of ports. Additionally, the coolant control ball valve assembly comprises an actuator assembly in communication with the valve element. The actuator assembly includes an expansion element, and linear translation of the actuator assembly results in rotational translation of the valve element. Further, the coolant control ball valve comprises a flow diverter positioned adjacent the valve element. The flow diverter allows for coolant to reach a minimum velocity around the expansion element.

19 Claims, 11 Drawing Sheets

(51) Int. Cl.
*F16K 11/087* (2006.01)
*F01P 7/14* (2006.01)

(52) U.S. Cl.
CPC ..... *F16K 11/0873* (2013.01); *Y10T 137/7737* (2015.04); *Y10T 137/86863* (2015.04)

(58) Field of Classification Search
CPC ..... Y10T 137/86871; Y10T 137/86743; Y10T 137/86751; Y10T 137/86638; Y10T 137/86646; Y10T 137/86654; Y10T 137/86541; Y10T 137/86549

USPC ........... 251/205–209, 304–315.16; 236/93 a, 236/93 r, 99 J, 101 c, 101 R, 34, 34.5; 137/468, 625.46, 625.47, 625.31, 625.32, 137/625.21, 625.22, 625.23, 625.15, 137/625.16; 123/41.02, 41.08, 41.09, 123/41.1, 41.4

See application file for complete search history.

(56) References Cited

U.S. PATENT DOCUMENTS

| | | | |
|---|---|---|---|
| 7,963,455 B2 | 6/2011 | Heldberg et al. | |
| 8,028,926 B2 | 10/2011 | Heldberg et al. | |
| 8,186,604 B2* | 5/2012 | Park | F01P 7/16 236/34.5 |
| 8,757,110 B2* | 6/2014 | Triebe | F01P 7/14 123/41.1 |
| 8,844,474 B2* | 9/2014 | Fukuoka | F01P 3/02 123/41.08 |
| 8,899,548 B2 | 12/2014 | Hauk | |
| 9,341,107 B2* | 5/2016 | Heldberg | F01P 7/167 |
| 9,377,789 B2* | 6/2016 | Lee | G05D 23/1333 |
| 9,567,894 B2* | 2/2017 | Oikawa | F16K 5/0471 |
| 9,581,336 B2* | 2/2017 | Besati | G05D 23/02 |
| 9,841,115 B2 | 12/2017 | Gramss et al. | |
| 9,885,483 B2* | 2/2018 | Besati | F23N 5/14 |
| 9,951,878 B2 | 4/2018 | Heldberg | |
| 10,458,562 B2* | 10/2019 | Ozeki | F16K 31/041 |
| 10,683,940 B1 | 6/2020 | Quade et al. | |

* cited by examiner

BALLSTAT FLOW DIVERTER

CROSS REFERENCE TO RELATED APPLICATIONS

This application is based on, claims priority to, and incorporates herein by reference in its entirety U.S. Provisional Application No. 62/954,066, filed on Dec. 27, 2019, and U.S. Provisional Application No. 62/896,800, filed on Sep. 6, 2019.

BACKGROUND OF THE INVENTION

1. Field of the Invention

The present invention relates generally to coolant control valves and, more particularly, to a flow diverter added to a coolant control valve for a cooling system of a vehicle.

2. Description of the Background of the Invention

Coolant control valves are used in coolant circuits of vehicles, such as cars or trucks, for cooling an internal combustion engine. It is known in the art to arrange a thermostat, expansible element, or wax motor in the cooling circuit of an internal combustion engine to regulate the coolant flow through the coolant control valve. The expansible element is responsible for adjusting the coolant control valve by opening and closing the paths of coolant through the valve. Coolant is guided through the control valve via a bypass line during a warm-up phase of the internal combustion engine. Expansible elements operate temperature-dependently in a known manner. If the coolant has reached a predetermined temperature, the expansible element opens the path through the radiator and closes the bypass. As the engine temperature decreases, the operation is reversed with the flow in from the radiator being closed to adjust the target engine temperature.

Many known coolant control valves include a thermostat or expansible element that opens and closes the valve depending on the internal temperature of the engine. Typical expansible elements require a minimum fluid velocity around the expansible element to provide sufficient heat transfer and to perform correctly. Further, a minimum pressure drop through the system is required in order for the system to efficiently perform. In the instance that the fluid does not reach the minimum fluid velocity, the expansible element may delay in activating once the target engine temperature is reached. This delay results in the engine cooling slowing down, which may lead to the possibility of engine overheating. A need therefore exists for a coolant control valve that increases the fluid velocity around the expansible element and provides an acceptable pressure drop at full flow.

SUMMARY OF THE INVENTION

In one aspect, a coolant control ball valve assembly comprises a housing that includes a housing chamber. The coolant control ball valve assembly further comprises a channel and a plurality of ports that extend from the housing chamber, and a valve element positioned in line with the channel and the plurality of ports. Additionally, the coolant control ball valve assembly comprises an actuator assembly in communication with the valve element. The actuator assembly includes an expansion element, and linear translation of the actuator assembly results in rotational translation of the valve element. Further, the coolant control ball valve comprises a flow diverter positioned adjacent the valve element. The flow diverter allows for coolant to reach a minimum velocity around the expansion element.

In some embodiments, the valve element is a ball valve. In other embodiments, the actuator assembly comprises a transmission rod that extends upwardly from the expansion element. The transmission rod comprises an elongated slot and the valve element comprises an actuation pin that passes through the elongated slot of the transmission rod. In further embodiments, the flow diverter extends through the channel. In some embodiments, the flow diverter and a bearing block comprise a channel that extends therethrough. The channel of the flow diverter is configured to direct fluid at the expansion element.

In another aspect, a coolant control ball valve assembly comprises a housing that includes a housing chamber, and a channel and a plurality of ports that extend from the housing chamber. The coolant control ball valve further includes a valve element comprising a spherical shape and that is positioned within the housing chamber. Additionally, the coolant control ball valve assembly comprises an actuator assembly in communication with the valve element, and the actuator assembly comprises an expansion element. Further, the coolant control ball valve assembly comprises a bearing block positioned between the actuator assembly and the valve element. The bearing block comprises a flow diverter, and the flow diverter increases a velocity of coolant around the expansion element.

In some embodiments, the flow diverter is positioned under and axially offset from the bearing block. In other embodiments, the valve element is pivotably mounted in the housing by bearing journals, and the valve element comprises an actuation pin that runs parallel and eccentrically to the bearing journals. In further embodiments, the flow diverter comprises two sidewalls that extend downwardly from the bearing block. The two sidewalls are connected by an angled wall that extends between the two sidewalls. The angled wall has a rounded non-symmetrical shape. The angled wall, the two sidewalls, and a bottom portion of the bearing block define a channel of the flow diverter. The channel of the flow diverter is configured to direct fluid at the expansion element. The angled wall and the two sidewalls comprise a lip that extends near the valve element. In other embodiments, linear translation of the actuator assembly results in rotational translation of the valve element.

In yet another aspect, a coolant control ball valve assembly comprises a housing that includes a housing chamber. The coolant control ball valve assembly further comprises a channel, a first port, and a second port that extend from the housing. The coolant control valve assembly also includes a valve element positioned within the housing chamber, an expansion element, and a flow diverter positioned under the valve element and facing the expansion element. The flow diverter extends through the channel and the flow diverter increases a velocity of coolant around the expansion element.

In other embodiments, the flow diverter comprises two sidewalls that extend downwardly from a bearing block positioned between the expansion element and the valve element. One of the two sidewalls extends farther downward than the other sidewall. In some embodiments, the channel and the first port are integrally molded with the housing and the second port is fastened to the housing.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
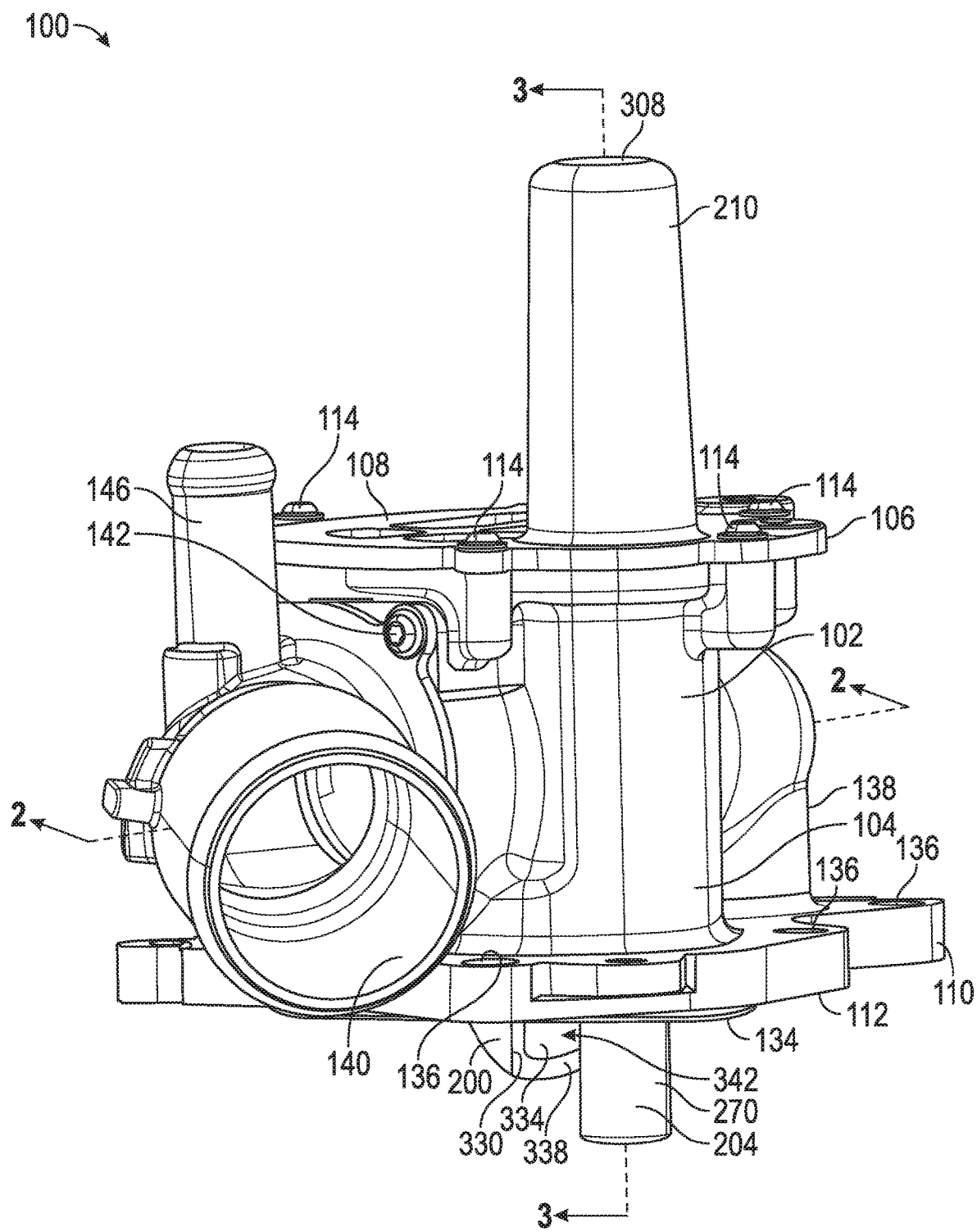
FIG. 1 is an isometric view of a coolant control ball valve assembly, according to one embodiment.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide for a coolant control valve comprising a specialized flow diverter. Specifically, the flow diverter allows for the flow velocity around an expansible element or wax motor to increase such that the minimum coolant velocity for the expansible element can be reached. The flow diverter further minimizes the pressure drop associated with the conversion of the valve from using a bypass line to using a radiator line. As a result of the flow diverter, the expansible element can efficiently operate without delays to the engine cooling.

Figure 2:
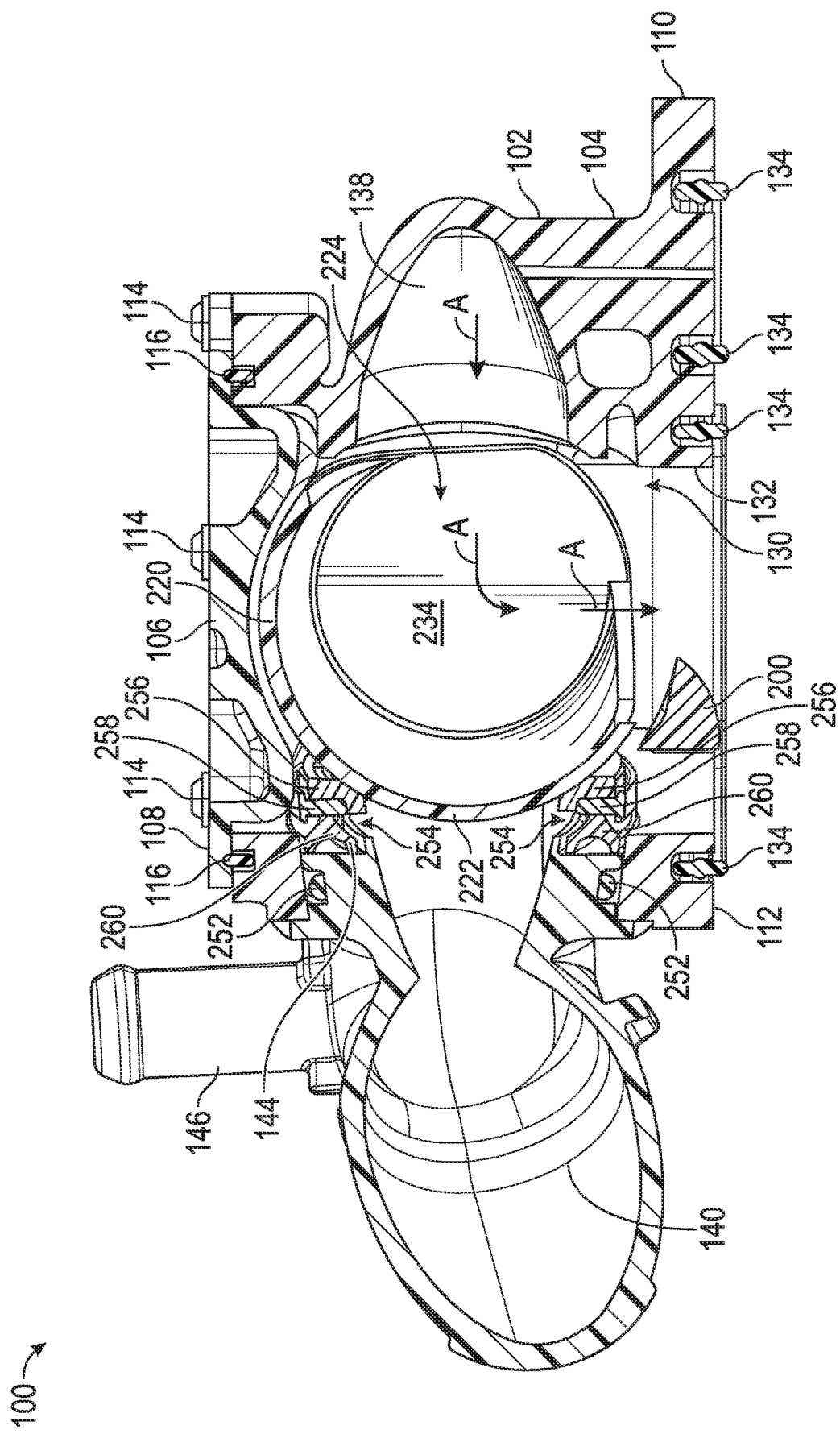
FIG. 2 is a cross-sectional view taken along lines 2-2 of the coolant control ball valve assembly of FIG. 1.

FIG. 1-13 illustrate a coolant control ball valve assembly 100 in accordance with the present disclosure. Referring to FIGS. 1 and 2, an isometric view and a cross sectional view of the control valve 100 are shown, respectively. The control valve assembly 100 is provided for a cooling system of a vehicle, for example a passenger motor vehicle or a truck. Further, the cooling system may be part of an engine, such as an internal combustion engine, of the vehicle. In one embodiment, the control valve assembly 100 may be arranged in an auxiliary circuit of such a cooling system. As noted herein, it is contemplated that the control valve assembly 100 may be used in any type of engine or vehicle system. For example, the control valve assembly 100 may be part of a hybrid motor vehicle or a fully electric motor vehicle. Further, the control valve assembly may be part of an auxiliary circuit coolant control system, such as in line with the transmission or the vehicle cabin heating system.

Referring still to FIGS. 1 and 2, the valve assembly 100 comprises a housing 102 that includes a body 104 and a cover 106. The cover 106 defines an upper portion 108 of the housing 102, and the body 104 comprises a flange 110 extending outwardly from the body 104 that defines a lower portion 112 of the housing 102. The body 104 and the cover 106 are clamped together by planar surface segments and may be tightly joined to each other by a plurality of fasteners 114. Additionally, a first press and plate gasket 116 is placed between the mutually abutting surface segments of the body 104 and the cover 106. The first press and plate gasket 116 assists in securely fastening the body 104 to the cover 106 to form the housing 102. In alternative embodiments, the housing 102 may be formed from more than just the body 104 and cover 106 and may comprise any shape to correctly direct coolant flow.

Referring again to FIGS. 1 and 2, the body 104 and the cover 106 form a housing chamber 130 therebetween. In the present embodiment, the housing chamber 130 is fitted with a channel 132 and two ports that extend from the housing chamber 130 and/or the housing 102. The channel 132 connects to the cooling duct system of the internal combustion engine (not shown), or the channel 132 may be in line directly with the internal combustion engine. In preferred embodiments, the channel 132 is in communication with a water adapter or pump (not illustrated) which is positioned directly under the body 104 of the housing 102. In such a configuration, the water adapter or pump is in direct communication with the internal combustion engine. As illustrated in FIG. 2, the water adapter may be fastened to the flange 110 of the body 104, defining the lower portion 112 of the housing 102. Similarly, as discussed above, the housing 102 may be attached to the water adapter by a plurality of fasteners (not shown) and a second press and plate gasket 134. Additionally, the housing 102 of the control valve assembly 100 comprises a plurality of torque limiters 136 that assist in protecting the control valve assembly 100 and securely fastening the housing 102 to the water adapter. In alternative embodiments, the valve assembly 100 may be attached to a different portion of the engine or cooling system and may comprise alternate or additional flow configurations.

Referring still to FIGS. 1 and 2, the control valve assembly 100 further comprises a first port or bypass line 138 and a second port 140. The first port 138 is in communication with the bypass line of the cooling system and the second port 140 communicates with a radiator of the engine. In alternative embodiments, the first port 138 and the second port 140 may be in communication with any component of the coolant system of the engine. As illustrated in FIG. 1, the channel and first port 132, 138 are integrally molded or formed with the body 104 of the housing 102 and the second port 140 is securely fastened to the body 104 of the housing 102 by a plurality of fasteners 142 (only one fastener 142 shown in FIG. 1). As will be discussed in further detail herein, the second port 140 comprises a sealing pack 144 that securely fastens the second port 140 to the housing chamber 130. In alternative embodiments, the second port 140 may be integrally molded or formed with the body 104 of the housing 102, similarly to the channel and first port 132, 138. Further, the second port 140 comprises an auxiliary line 146 that extends upwardly from the second port 140, and past the cover 106 of the housing 102. The auxiliary line 146 may extend to another portion of the engine, for example, to a transmission oil heater. While one channel and two ports are depicted, one skilled in the art will understand that any number of suitable channels or ports may be utilized.

The housing 102 is made up of an appropriate plastic or cast light metal. In preferred embodiments, the housing 102 is made up of a plastic with approximately 40% PPS and 40% glass. In alternative embodiments, the housing 102 may be formed of PPA or PA66 with 30%-40% glass reinforcement. It is contemplated that the housing 102 may be formed from any plastic that will allow the control valve assembly 100 to operate efficiently.

Figure 3:
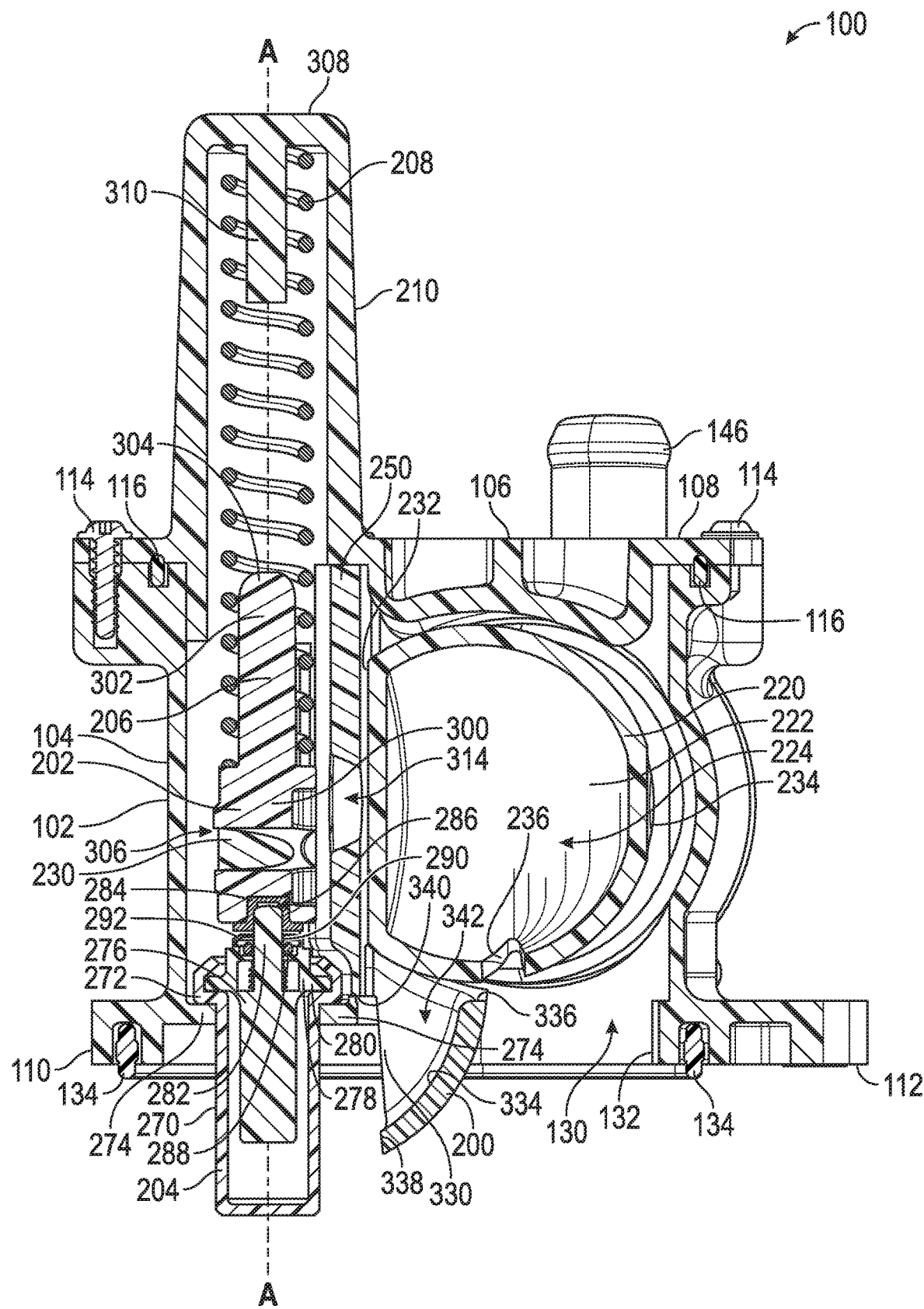
FIG. 3 is a cross-sectional view taken along lines 3-3 of the coolant control ball valve assembly of FIG. 1.

Referring to FIG. 3, another cross sectional view of the control valve assembly 100 is shown. As illustrated in FIG. 3, the channel 132 can be seen in greater detail. As will be discussed in further detail herein, a flow diverter 200 is positioned within the housing chamber 130 adjacent to the channel 132, and the flow diverter 200 extends through the channel 132. Additionally, an actuator assembly 202 is illustrated in FIG. 3. In one embodiment, the actuator assembly may be a ball actuator assembly. The actuator assembly 202 comprises an expansible or expansion element or wax motor 204 extending parallel with the channel 132 and past the lower portion 112 of the housing 102. The expansible element 204 is in contact with a ball drive plunger or transmission rod 206 that extends upwardly from the expansible element 204. The transmission rod 206 is press fit in the body 104 of the housing 102. In this embodiment, the transmission rod 206 is in in communication with a spring 208 extending upwardly therefrom. The spring 208 may comprise any type of spring force such that that control valve assembly 100 may work efficiently. In some embodiments, the spring constant is approximately 5.9 and the spring force may be approximately 110 N-180 N. In preferred embodiments, the spring force is approximately 130 N. The spring 208 is housed in a spring tower 210 that defines a component of the cover 106 of the housing 102. As illustrated in FIG. 3, the spring tower 210 extends generally parallel with the auxiliary line 146 and comprises a generally cylindrical shape. In alternative embodiments, the spring tower 210 may be larger or smaller than shown to accommodate the size or shape of the spring 208. The expansible element 204, the transmission rod 206, and the spring 208 define the actuator assembly 202.

Figure 4:
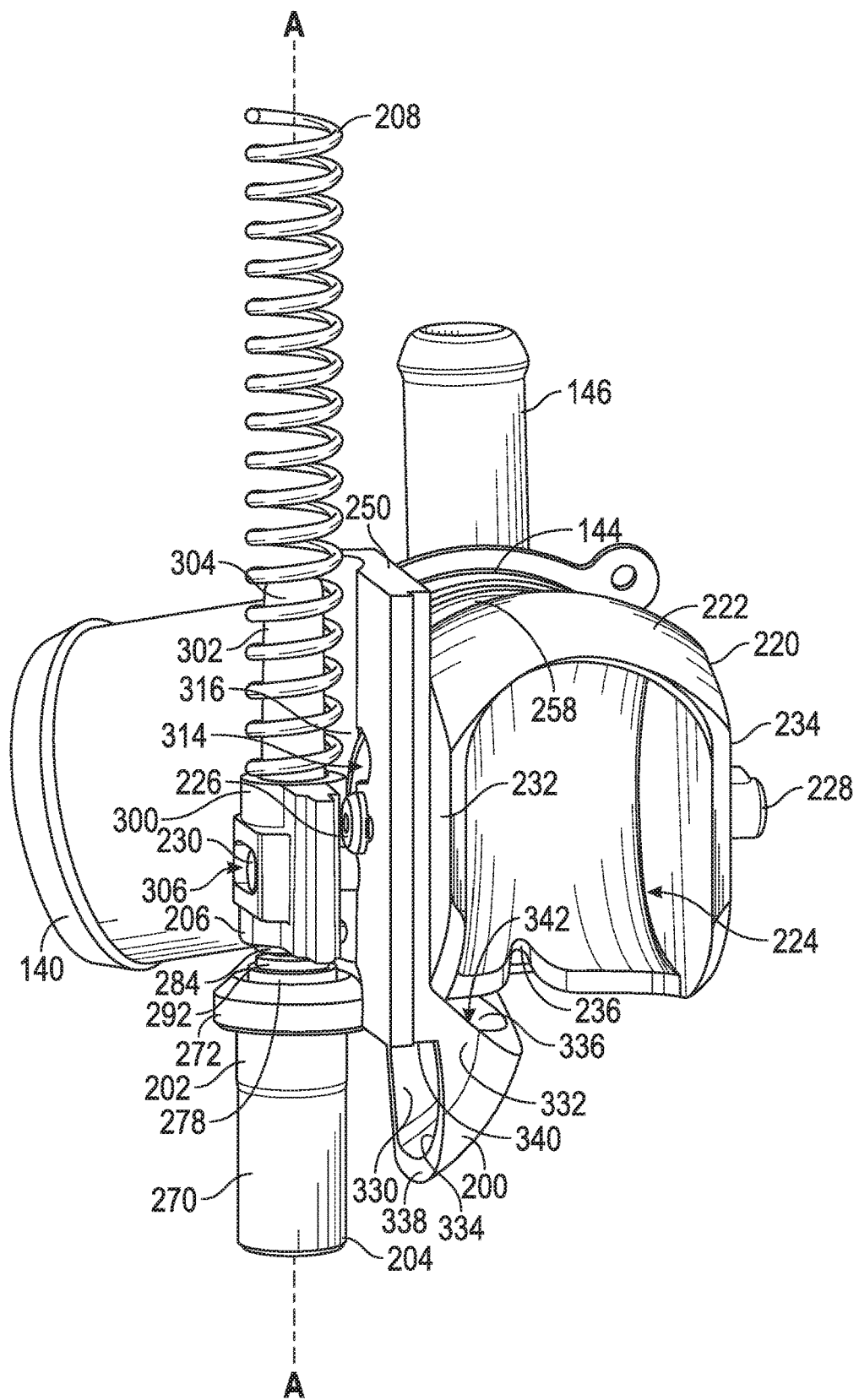
FIG. 4 is an isometric view of the coolant control ball valve assembly of FIG. 1 without a housing.

Referring to FIG. 4, an isometric view of the control valve assembly 100 without the housing 102 is shown. The control valve assembly 100 includes a valve element 220 positioned within the housing chamber 130 (see FIG. 3), and the valve element 220 defines a generally spherical-shell shape with a rounded wall 222. The valve element is positioned in line with the channel 132 and the first and second ports 138, 140. In one embodiment, the valve element 220 is a ball valve. In the present embodiments, the valve element 220 comprises an aperture 224 and bearing journals 226, 228, which are arranged on opposite sides of the valve element 220. The aperture 224 is defined by the valve element 220 having openings on two sides, perpendicular to each other, of the rounded wall 222. Further, the valve element 220 is pivotably mounted in the housing 102 via the bearing journals 226, 228 such that the valve element 220 may rotate along the bearing journals 226, 228 to connect the first port 138 to the channel 132 or the second port 140 to the channel 132. In some embodiments, the bearing journals 226, 228 may be formed from PPS with PTFE infused and glass. Further, the valve element 220 comprises an actuation pin 230 mounted on the valve element 220. The actuation pin 230 runs parallel and eccentrically to the bearing journal 226. Laterally at the bearing journals 226, 228, the valve element 220 is fitted with flat surfaces 232, 234, respectively, that define two distal edges of the valve element 220. As a result of the flat surfaces 232, 234, the valve element 220 assumes an externally spherical shape only across the width of the rounded wall 222.

Referring again to FIG. 4, two sides of the rounded wall 222 of the valve element 220 are removed, creating the aperture 224. As discussed above, the two sides are perpendicular such that the valve element 220 can direct flow from a first axial direction to a second axial direction, perpendicular to the first axial direction. Additionally, the valve element 220 comprises a slit 236 extending into the rounded wall 222. As illustrated in FIG. 4, the rounded wall 222 of the valve element 220 is blocking the second port 140. As a result, coolant from the radiator is not allowed to circulate through the control valve assembly 100. Rather, as illustrated in FIG. 2, the coolant flows in the direction of arrows A from the first port 138 to the channel 132. In such a configuration, the valve element 220 is at a start or first position. During engine warm-up, the valve element 220 is configured in the first position to heat up the engine as quickly as possible.

Figure 5:
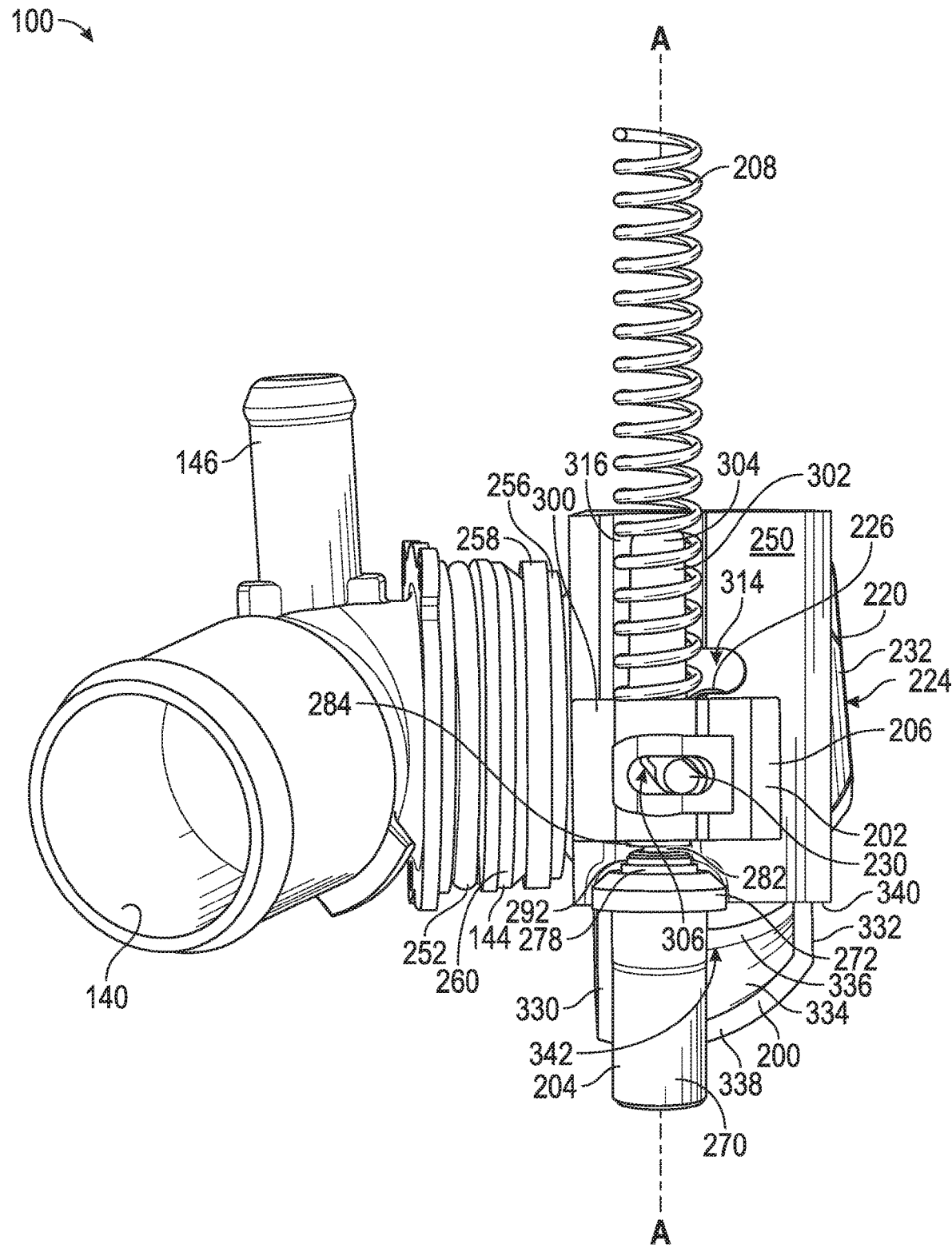
FIG. 5 is a front view of the coolant control ball valve assembly of FIG. 4.

Referring to FIG. 5, a front view of the control valve assembly 100 without the housing 102 is shown and the actuator assembly 202 is shown in greater detail. As illustrated in FIG. 5, the flow diverter 200 is lined up or in line with the expansible element 204. The flow diverter 200 is integrally molded with a bearing block 250 that is positioned behind the transmission rod 206 and the actuator assembly 202. As such, the bearing block 250 comprises the flow diverter 200. The bearing block 250 is press fit into the body 104 of the housing 102 between the transmission rod 206 and the valve element 220. Put differently, the bearing block is positioned between the actuator assembly 202 and the valve element 220. As depicted in FIG. 5, all of the components of the actuator assembly 202 are aligned with each other along a longitudinal axis A, and the actuator assembly 202 is configured to translate along the longitudinal axis A. Additionally, the sealing pack 144 of the second port 140 is illustrated in FIG. 5.

Referring to FIGS. 2 and 5, the sealing pack 144 securely seals the second port 140 with the valve element 220. As illustrated in FIGS. 2 and 5, an oil seal 252 is placed around the second port 140. The oil seal 252 works with the sealing pack 144 to securely seal the second port 140 to the valve element 220. The sealing pack 144 is mounted in a circular clearance 254 issuing from the housing chamber 130 (see FIG. 2). Further, the sealing pack 144 consists of a PTFE ring or slideable ring 256, a support ring 258, and a sealing annulus 260. The geometry of the slideable ring 256 on the side facing the valve element 220 matches the spherical surface of the rounded wall 222 of the valve element 220, and the sealing annulus 260 approximately assumes a cross-sectional V shape. In addition to acting as a seal, the sealing annulus 260 also acts as a spring to exert a spring force such that the slideable ring 256 rests at a predetermined force against the valve element 220. The support ring 258 is positioned between the slideable ring 256 and the sealing annulus 260 to further assist in securely sealing the second port 140 to the valve element 220. As noted herein, it is contemplated that the sealing pack 144 of the control valve assembly 100 can be any type of sealing system to sufficiently seal the second port 140 to the valve element 220 and the housing 102. In some embodiments, the sealing system or sealing pack is disclosed in U.S. Pat. Nos. 7,963,455 and 9,951,878, which are incorporated herein by reference in their entirety. In alternative embodiments, the first port 138 may also include a sealing system similar to the sealing pack 144 for the second port 140.

Referring to FIGS. 3 and 5, the expansible element 204 comprises a cylindrical portion 270, and the expansible element 204 is fitted with a radial flange 272 that rests on an inner shoulder 274 of the body 104 in the housing chamber 130. The cylindrical portion 270 of the expansible element 204 comprises a temperature activation area. In other words, the cylindrical portion 270 of the expansible element 204 is capable of sensing the temperature of the coolant around it. In alternative embodiments, a different portion of the expansible element 204 may comprise the temperature activation area. In preferred embodiments, an insert 276 is positioned within the expansible element 204, and a cap 278 is placed over a top end of the insert 276 (see FIG. 3). As illustrated in FIG. 3, the cap 278 comprises a second radial flange 280 that is fitted inside the radial flange 272 of the expansible element 204. A pin 282 is positioned within the insert 276 of the expansible element 204, and the pin 282 is configured with a ball drive plunger cap or bracket 284 extending into a blind hole 286 of the transmission rod 206. The bracket 284 is formed from metal and distributes the load from the expansible element 204 on the transmission rod 206, therefore protecting the transmission rod 206 during operation. The insert 276 further comprises an O-ring 288 and a washer 290 that extend around the pin 282 and seal with the cap 278 to close a top end 292 of the expansible element 204. During operation, the expansible element 204 detects the temperature of the coolant around the temperature activation area of the expansible element 204. Once the coolant temperature reaches a certain temperature, the expansible element 204 will activate and actuate the pin 282 upwardly along the longitudinal axis A. As noted herein, it is contemplated that the expansible element 204 of the control valve assembly 100 can be any type of expansible element, thermostat, or wax motor. In one embodiment, the expansible element 204 is disclosed in U.S. Pat. No. 8,028,926 which is incorporated herein by reference in its entirety. In alternative embodiments, the control valve assembly 100 may be driven by a DC motor, DC motor actuator, vacuum motor, or solenoid actuator, for example.

Referring again to FIGS. 3 and 5, the transmission rod 206 is configured above and coaxial with the expansible element 204. The transmission rod 206 comprises a generally rectangular base 300 with a finger 302 extending upwardly therefrom. The finger 302 is axially aligned with the longitudinal axis A of the actuator assembly 202 and comprises a generally cylindrical shape with a rounded top 304. As discussed above, the transmission rod 206 comprises the blind hole 286 aligned with the longitudinal axis A of the actuator assembly 202 with the bracket 284 placed therein. In the present embodiments, the transmission rod 206 comprises an elongated slot 306 which is transverse to the longitudinal axis A. The actuation pin 230 of the valve element 220 passes through the elongated slot 306, thus communicating with the actuator assembly 202. As illustrated in FIGS. 3 and 5, one end of the spring 208 rests against an upper end 308 of the spring tower 210 while the other end of the spring 208 rests against the base 300 of the transmission rod 206 in order to pre-stress the transmission rod 206 against the expansible element 204. The spring 208 is aligned by a guide pin 310 extending downwardly from the upper end 308 of the spring tower 210 and by the finger 302 of the transmission rod 206 (see FIG. 3).

Figure 6:
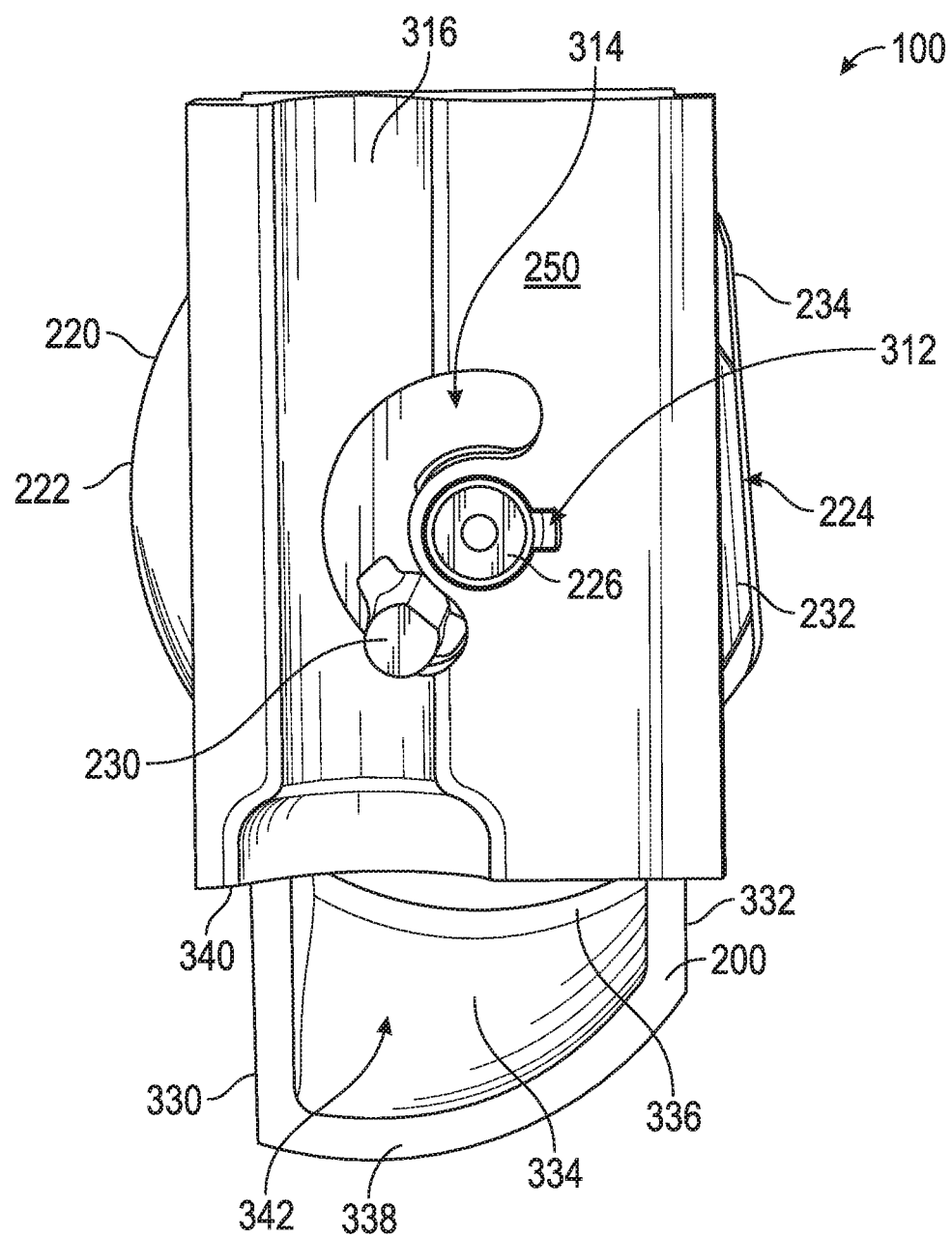
FIG. 6 is a front view of a bearing block and a valve element of the coolant control ball valve assembly of FIG. 4.

Referring to FIG. 6, a front view of the bearing block 250 attached to the valve element 220 is shown. The bearing block 250 comprises an aperture 312 which receives the journal bearing 226 of the valve element 220. The flat surface 232 of the valve element 220 is positioned against a back side of the bearing block 250. Additionally, the bearing block 250 comprises a slot 314 extending entirely through the bearing block 250, and the slot 314 may have a generally crescent shape that extends partially around the aperture 312. The actuation pin 230 of the valve element 220 extends through the slot 314 of the bearing block 250. As will become more apparent upon further discussion herein, the crescent shape of the slot 314 defines a cam profile for the actuation pin 310 to take while the transmission rod 206 translates along the longitudinal axis A (see FIG. 5). Further, the bearing block 250 includes grooves 316 that align with the actuator assembly 202, such that the bearing block 250 may be press fit in the housing 102 with the actuator assembly 202 in the appropriate position.

Figure 7:
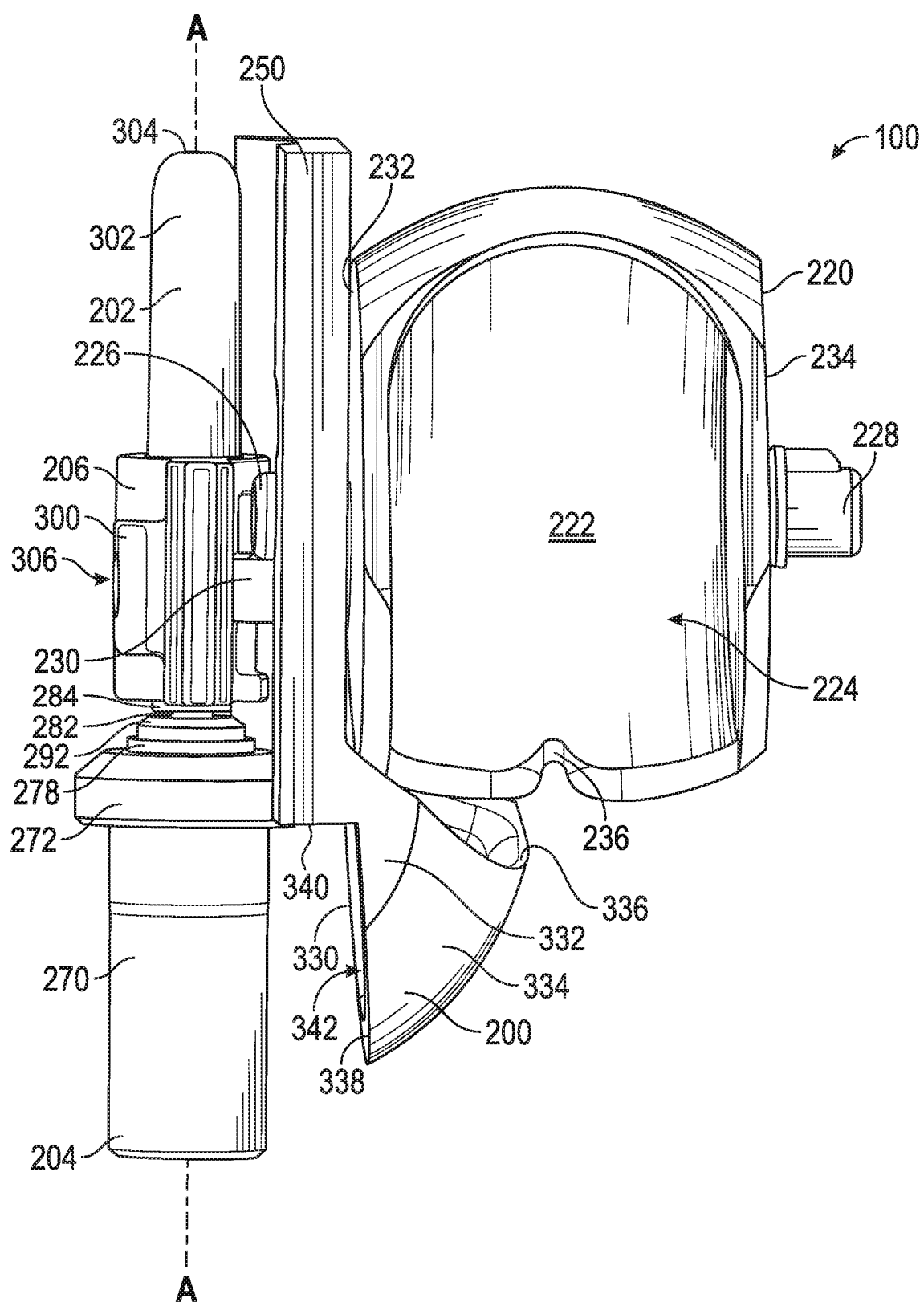
FIG. 7 is a side view of the bearing block and the valve element of FIG. 6 with an actuator assembly attached.

Referring to FIG. 7, a side view of the bearing block 250, the valve element 220, and actuator assembly 202 is shown. The flow diverter 200 is shown positioned under and axially offset from the bearing block 250. As a result of being axially offset, the flow diverter 200 is positioned adjacent to and under the valve element 220, such that coolant flow from the valve element 220 is diverted through the flow diverter 200.

Referring to FIGS. 8-11, various views of the bearing block 250 are shown to depict the flow diverter 200 with greater clarity. As illustrated in FIGS. 8-11, the flow diverter 200 has a generally spade or shovel type shape. The shape of the flow diverter 200 is hydrodynamic such that the coolant can easily flow through the channel 132 without too much disturbance in the flow from the flow diverter 200, i.e., limiting the pressure drop through the system. The flow diverter 200 includes two sidewalls 330, 332 extending downwardly from the bearing block 250. The sidewalls 330, 332 are connected by an angled or curved wall 334 that extends between the two sidewalls 330, 332. In one embodiment, the angled wall 334 has a generally smooth and rounded, non-symmetrical shape, having a wider portion near the sidewall 330 than the sidewall 332 (see FIGS. 10 and 11). Further, the angled wall 334 and the sidewalls 330, 332 comprise a lip 336 extending near the valve element 220, and the flow diverter 200 comprises a front end 338 generally aligned with the flat surface 232 of the valve element 220 (see FIG. 7). It is contemplated that the two sidewalls 330, 332, the lip 336, and the front end 338 may define the distal ends of the angled wall 334 of the flow diverter 200.

Figure 8:
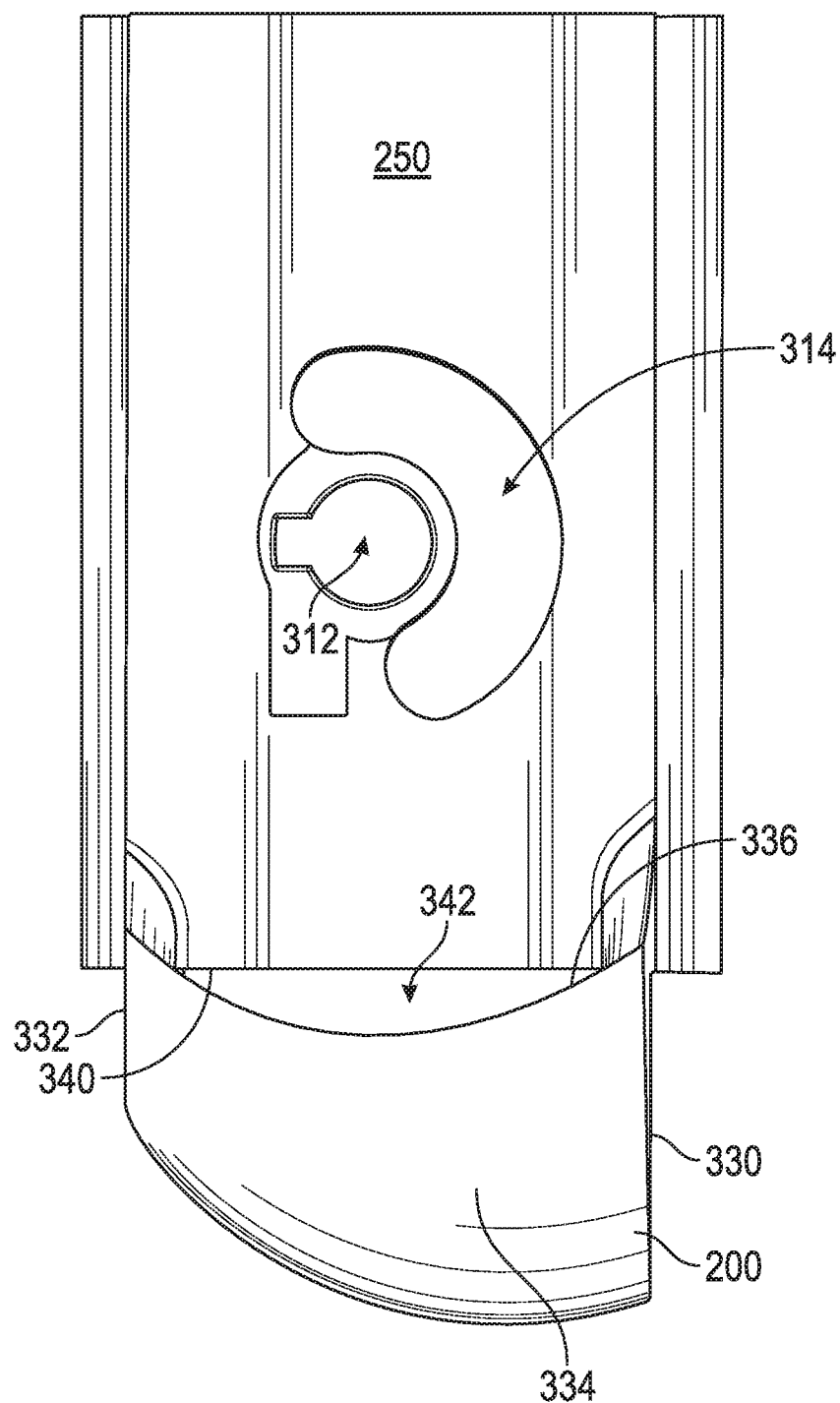
FIG. 8 is a rear view of the bearing block of FIG. 6 with the valve element removed.
Figure 10:
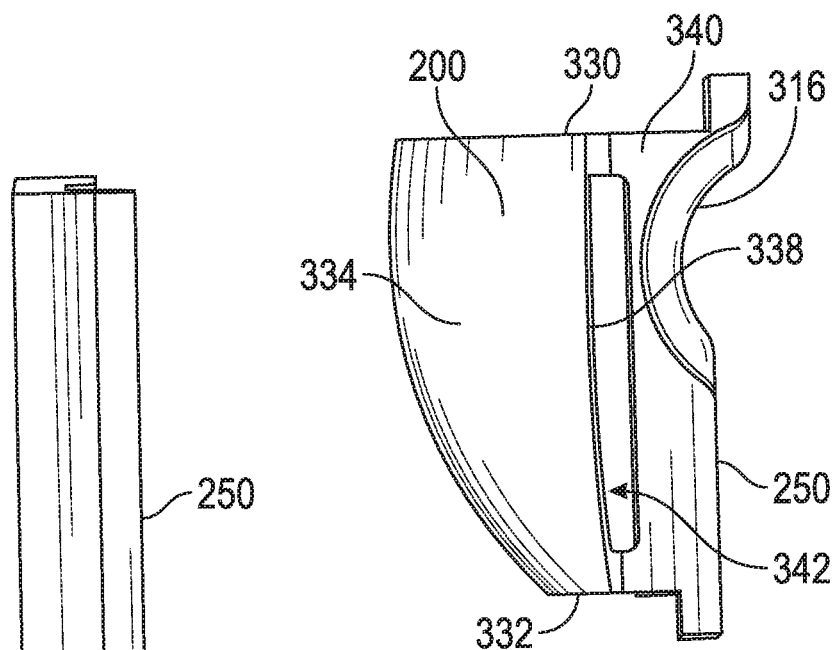
FIG. 10 is bottom view of the bearing block of FIG. 8.
Figure 9:
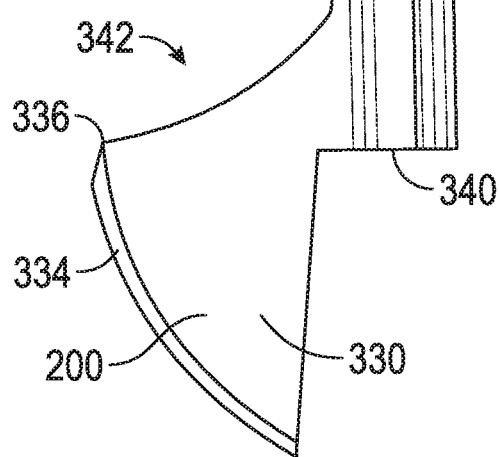
FIG. 9 is a side view of the bearing block of FIG. 8.
Figure 11:
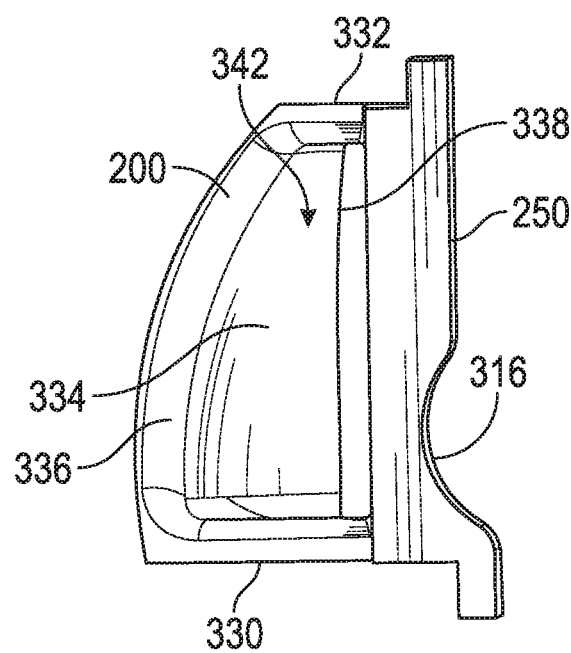
FIG. 11 is a top view of the bearing block of FIG. 8.

Referring to FIGS. 6 and 8-11, the angled wall 334 of the flow diverter 200 and a bottom portion 340 of the bearing block 250 comprise a channel 342 extending therethrough. The channel 342 of the flow diverter 200 is defined by the angled wall 334, the two sidewalls 330, 332, and the bottom portion 340 of the bearing block 250. As illustrated in FIGS. 6 and 8, the sidewall 330 extends farther downward than the sidewall 332. As a result, the front end 338 of the flow diverter 200 comprises an arched profile extending between the two sidewalls 330, 332. As discussed above, the arched profile of the front end 338 causes the angled wall 334 to extend further downward near the sidewall 330 than the sidewall 334. Furthermore, the lip 336 of the angled wall 334 comprises a parabolic arch extending from both sidewalls 330, 332 (see FIG. 8). In alternative embodiments, the sidewalls 330, 332 of the flow diverter 200 may extend downwardly to the same position.

Referring back to FIGS. 6 and 7, the axial offset position of the flow diverter 200 places the lip 336 and channel 342 of the flow diverter 200 directly under the aperture 224 of the valve element 220. As such, coolant flow from the first port 138 and/or the second port 140 may pass through the flow diverter 200 via the aperture 224 of the valve element 220. The valve element 220 is aligned with the flow diverter 200 such that a percentage of the coolant extending through the valve element 220 is funneled through the flow diverter 200.

Referring to FIG. 7, the front end 338 of the flow diverter 200 faces the expansible element 204 of the actuator assembly 202. As a result, the channel 342 of the flow diverter 200 is configured to direct fluid at the expansible element 204. During operation, the coolant that is funneled through the flow diverter 200 is targeted directly on the cylindrical portion 270 or temperature activation area of the expansible element 204. Therefore, the expansible element 204 may efficiently respond to the temperature of the coolant flowing through the channel 132 of the control valve assembly 100. It is contemplated that the flow diverter 200 may comprise any shape that will allow the coolant to be directed at the expansible element 204.

Referring back to FIGS. 2-4, the valve element 220 is positioned in one end position, i.e., the at-rest or first position. As indicated, the channel 132 and the first port 138 are in communication with each other in the first position (see FIG. 2). On the other hand, in the first position, the second port 140 is blocked by the rounded wall 222 of the valve element 220. The first position of the valve element 220 will be assumed by the shown valve assembly when the internal combustion engine's coolant is cold, illustratively being at ambient temperature. When the engine starts, hot coolant from the engine moves through the bypass line and thus through the first port 138 of the control valve assembly 100. As indicated by the arrows A in FIG. 2, the coolant will be diverted from the first port 138 to the channel 132 by the valve element 220 being in the first position. After the coolant passes through the valve element 220, the coolant passes through the channel 132 of the control valve assembly 100. As discussed above, a portion of the coolant flowing through the valve element 220 flows toward the flow diverter 200. As a result, the coolant flowing toward the flow diverter 200 is funneled through the channel 342 of the flow diverter 200 and directed directly at the temperature activation area of the expansible element 204.

In order for the expansible element 204 to run efficiently, the coolant needs to comprise a minimum velocity around the expansible element 204 to provide sufficient heat transfer to the expansible element 204. If the minimum velocity is not reached, the expansible element 204 may delay in activating. The flow diverter 200 allows for the minimum velocity to be reached around the expansible element 204. In one embodiment, the coolant minimum velocity to provide sufficient heat transfer is approximately 0.1 m/s-0.3 m/s. In preferred embodiments, the coolant minimum velocity is 0.15 m/s.

After the coolant passes through the channel 132, the coolant is directed through the water adapter (not shown) and back into the engine to continuously heat the coolant. Therefore, the coolant is moved conventionally using a pump from the engine to the control valve assembly 100, via the bypass line and the first port 138, and back to the engine via the channel 132. The coolant will continue to flow from the engine and through the first port 138 in a continuous cycle as engine temperature and coolant temperature increases.

With reference to FIGS. 3-5, once the coolant reaches a target or a start to open (STO) coolant temperature, the expansible element 204 activates and actuates the pin 282 of the expansible element 204 upwardly along the longitudinal axis A of the actuator assembly 202. As a result of the translation of the pin 282, the transmission rod 206 additionally actuates or moves upward along the longitudinal axis A. As discussed above, the actuation pin 230 of the valve element 220 is positioned through the elongated slot 306 of the transmission rod 206. Therefore, as the transmission rod 206 moves upwardly along the longitudinal axis A, the actuation pin 230 moves with the transmission rod 206 along the slot 314 of the bearing block 250. Since the actuation pin 230 is eccentric to the pivot axis of the valve element 220, the valve element 220 will pivot as the transmission rod 206 drives the actuator pin 230 along the slot 314 of the bearing block 250. Therefore, the linear translation of the transmission rod 206 results in the rotational translation of the valve element 220 by way of the slot 314 and the position of the actuator pin 230. In some embodiments, the start to open (STO) coolant temperature is approximately between 70° C.-100° C. In preferred embodiments, the start to open (STO) coolant temperature is approximately 85° C.

As the valve element 220 begins to rotate, the second port 140 is opened to allow for colder coolant from the radiator to flow through the control valve assembly 100. In this manner, the flow is being split, namely one portion of the flow is moving through the valve element 220 from the first port 138 and another portion of the flow is moving through the valve element 220 from the second port 140. As the coolant temperature continues to rise, the expansible element 204 will further actuate the pin 282, causing the valve element 220 to continue to rotate. In other words, as the coolant temperature increases, the valve element 220 will continue to pivot to allow more flow through the second port 140, i.e., attempting to cool the system. If the coolant temperature continues to rise, the valve element 220 will continue to rotate until the valve element 220 reaches a second or end position. In the present embodiment, the excursion of the pivot angle for the valve element 220 is approximately 90°. However, in alternative embodiments, the excursion of the pivot angle can be greater or smaller than shown.

Figure 12:
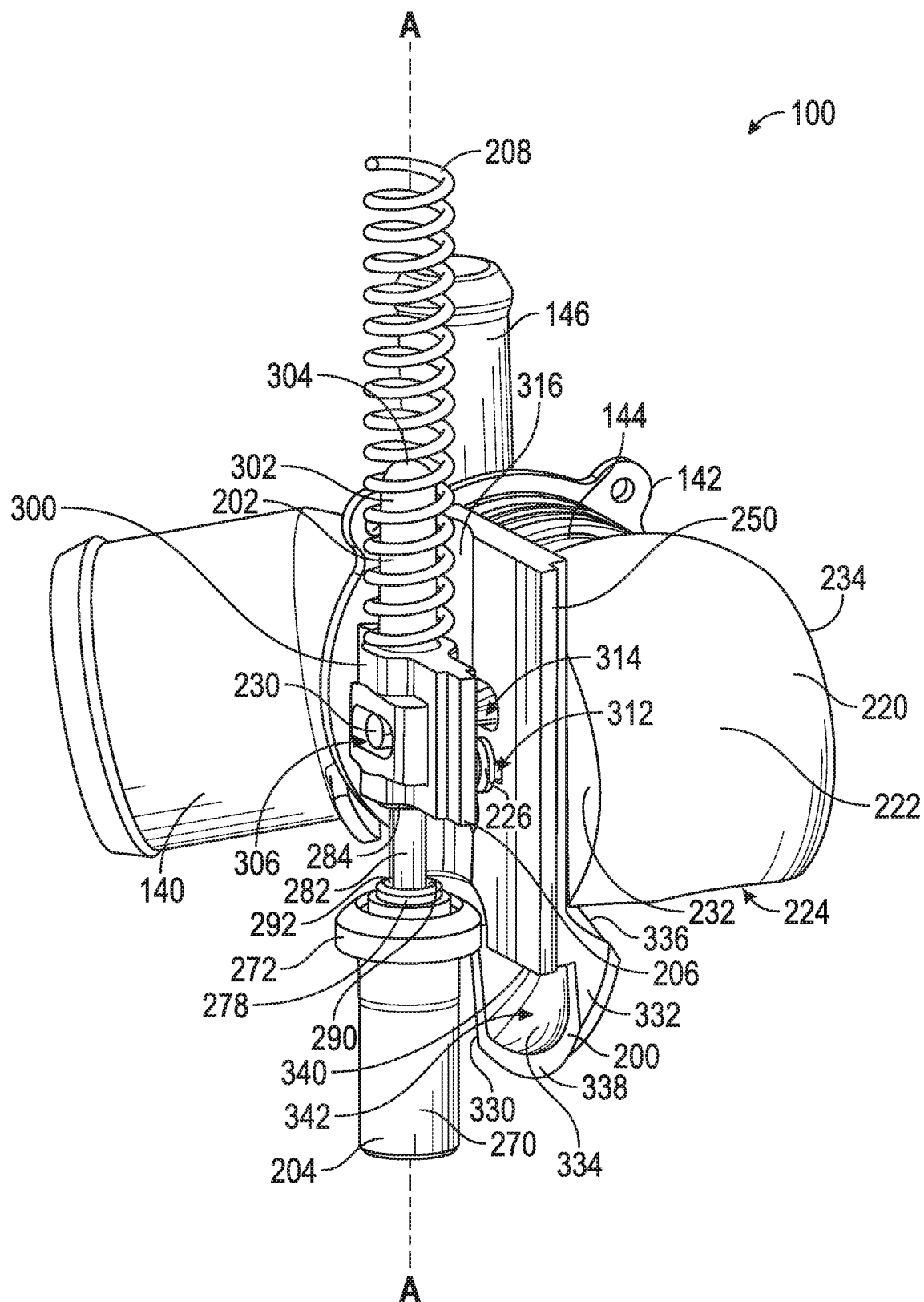
FIG. 12 is an isometric view of the coolant control ball valve assembly of FIG. 4 in a second position.
Figure 13:
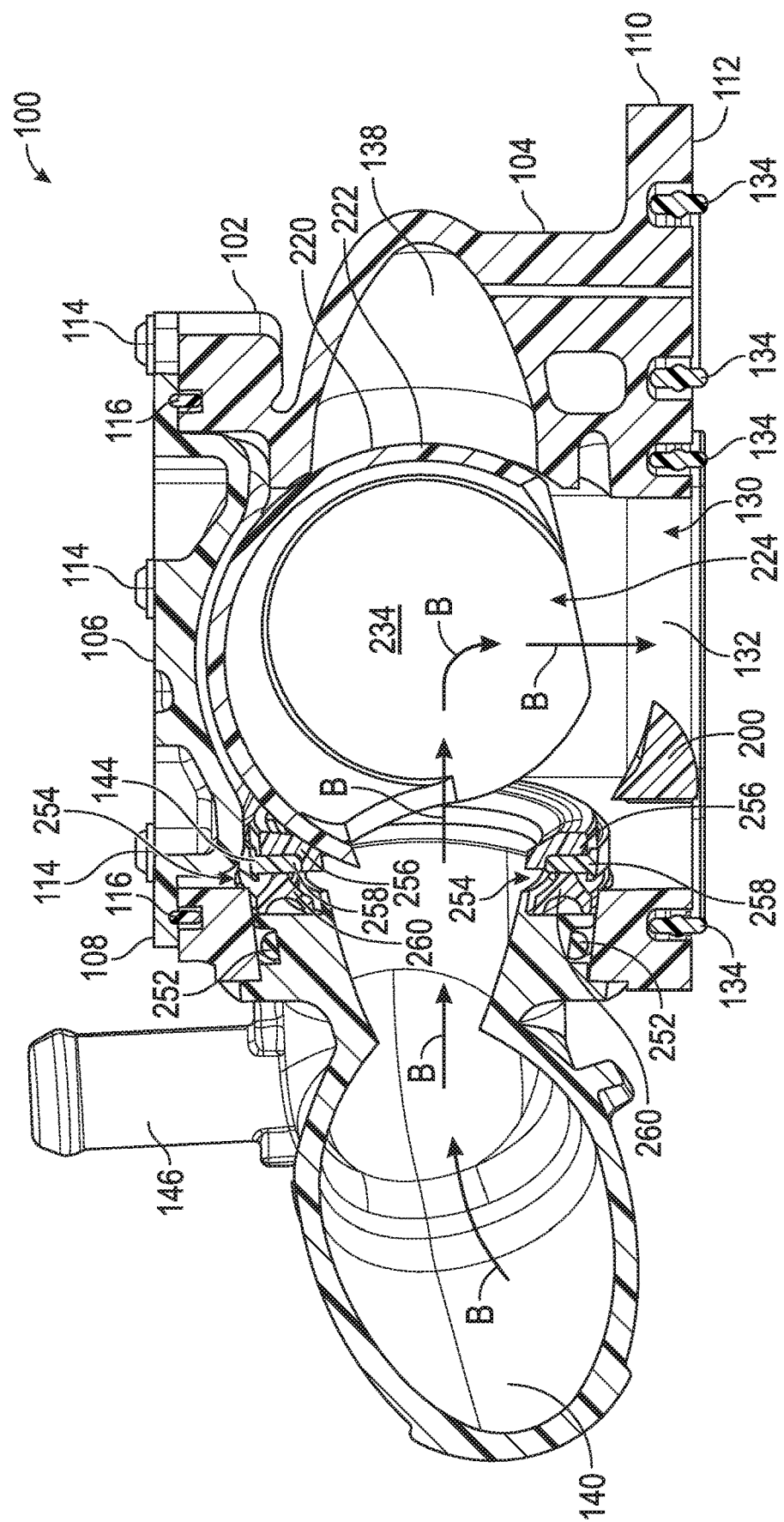
FIG. 13 is a cross-sectional view of the coolant control ball valve assembly of FIG. 1 in a second position.

With reference to FIGS. 12 and 13, an isometric view of the control valve assembly 100 without the housing 102 and a cross sectional view of the control valve assembly 100 is shown, respectively. As illustrated in FIGS. 12 and 13, the valve element 220 is positioned in the second position or end position. In the second position, all of the coolant flow through the valve element 220 is coming from the second port 140, as illustrated by arrows B in FIG. 13. As such, the bypass or first port 138 is blocked from coolant flowing through the control valve assembly 100 by the rounded wall 222 of the valve element 220. Therefore, only cold coolant from the radiator is flowing through the control valve assembly 100 to the engine. In some embodiments, 10 LPM-15 LPM of coolant may flow through the first port 138 when the valve element 220 is in the second position. As discussed above, some of the flow is directed via the flow diverter 200 over the expansible element 204. In the second position, the control valve assembly 100 is directly trying to cool the engine back to the optimal temperature, whereas in the first position, the control valve assembly 100 is trying to warm up or heat the engine.

With reference to FIGS. 2, 4, 12, and 13, as the engine temperature and coolant temperature cools, the pin 282 of the expansible element 204 will start to translate downwardly along the longitudinal axis A, rotating the valve element 220 back to the first or rest position. During regular operational use, the valve element 220 will continue to rotate between the first and second position trying to optimize the coolant temperature flowing through the control valve assembly 100. As such, the control valve assembly 100 acts as a controller, keeping the engine at an optimal temperature. Once the optimized coolant temperature and engine temperature are reached, the control valve assembly 100 will only need to slightly adjust the valve element 220 in order to allow for the appropriate amount of coolant to flow through the first port 138 and the second port 140. In some embodiments, the valve element 220 is mostly positioned at a point halfway between the first position and the second position, thus allowing approximately 50% of the coolant flow from the first port 138 and approximately 50% of the coolant flow from the second port 140.

With reference to FIGS. 7 and 12, the expansible element 204 drives the rotation of the valve element 220 by sensing the temperature through the temperature activation area on the cylindrical portion 270 of the expansible element 204. Therefore, the temperature of the coolant and the stroke distance of the pin 282 results in the open area of the valve element 220 with respect to the first and second ports 138, 140. As such, the expansible element 204 is an important component in optimizing the cooling temperature and overall engine temperature of the vehicle.

As discussed above, in order for the expansible element 204 to run efficiently, the coolant needs to comprise a minimum velocity around the expansible element 204 to provide sufficient heat transfer to the temperature activation area of the expansible element 204. If the minimum velocity is not reached, the expansible element 204 may delay in activating once the start to open (STO) coolant temperature is reached. A delay in the expansible element 204 results in the engine cooling being slowed or delayed, which can lead to possible engine overheating. Additionally, a delay in the expansible element 204 can create imbalances in the engine that cause the engine to lose efficiency. The addition of the flow diverter 200 to the control valve assembly 100 allows the coolant to be directly funneled at the expansible element 204, allowing the minimum velocity around the expansible element 204 to be reached. Put differently, the configuration of the flow diverter 200 allows for some of the coolant to be diverted or shot directly at specific portions of the expansible element 204, i.e., the temperature activation area, at a higher velocity than without the flow diverter 200. By reaching the minimum velocity, the expansible element 204 is able to work efficiently without delay and quickly operate to rotate the valve element 220.

As just described, the flow diverter 200 allows for the coolant to comprise a minimum velocity around the temperature activation area of the expansible element 204. Put differently, the flow diverter 200 increases the velocity of coolant around the expansion or expansible element 204. As a result, the coolant can efficiently provide sufficient heat transfer to the expansible element 204 and allow the expansible element 204 to heat up or cool down properly. The proper heating and cooling of the expansible element 204 limits the engines ability to overheat and allows the engine to perform at an optimum efficiency, which in turn provides savings on repairs and gas. Furthermore, the configuration and design of the flow diverter 200 allows for a minimum pressure drop through the system when flow is being shifted from flowing through the bypass (first port 138) to flowing through the radiator (second port 140), therefore allowing consistent flow. For example, the hydrodynamic features of the flow diverter 200 allow for the coolant to flow through the control valve assembly 100 without too much disruption in the fluid flow.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain how to practice the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A coolant control ball valve assembly, comprising:
   a housing including a housing chamber;
   a first channel and a plurality of ports extending from the housing chamber, wherein the first channel is defined by the housing;
   a valve element positioned in line with the first channel and the plurality of ports;
   an actuator assembly in communication with the valve element and comprising an expansion element, wherein linear translation of the actuator assembly results in rotational translation of the valve element, and wherein the expansion element is secured on an inner shoulder of the housing; and
   a flow diverter positioned adjacent the valve element,
   wherein the flow diverter allows for coolant to reach a minimum velocity around the expansion element,
   wherein the flow diverter comprises at least one surface that defines a second channel,
   wherein the second channel of the flow diverter is configured to funnel the coolant directly at the expansion element, and wherein the at least one surface of the flow diverter is spaced from the inner shoulder of the housing.

2. The coolant control ball valve assembly of claim 1, wherein the valve element is a ball valve.

3. The coolant control ball valve assembly of claim 1, wherein the actuator assembly comprises a transmission rod that extends upwardly from the expansion element.

4. The coolant control ball valve assembly of claim 3, wherein the transmission rod comprises an elongated slot, and wherein the valve element comprises an actuation pin that passes through the elongated slot of the transmission rod.

5. The coolant control ball valve assembly of claim 1, wherein the flow diverter extends through the first channel of the housing.

6. The coolant control ball valve assembly of claim 1, wherein the flow diverter and a portion of a bearing block further define the second channel.

7. A coolant control ball valve assembly, comprising:
a housing comprising a housing chamber;
a first channel and a plurality of ports extending from the housing chamber;
a valve element comprising a spherical shape and positioned within the housing chamber;
an actuator assembly in communication with the valve element, wherein the actuator assembly comprises an expansion element; and
a bearing block positioned between the actuator assembly and the valve element, wherein the bearing block comprises a flow diverter,
wherein the flow diverter increases a velocity of coolant around the expansion element.

8. The coolant control ball valve assembly of claim 7, wherein the flow diverter is positioned under and axially offset from the bearing block.

9. The coolant control ball valve assembly of claim 7, wherein the valve element is pivotably mounted in the housing by bearing journals, and wherein the valve element comprises an actuation pin that runs parallel and eccentrically to the bearing journals.

10. The coolant control ball valve assembly of claim 7, wherein the flow diverter comprises two sidewalls extending downwardly from the bearing block.

11. The coolant control ball valve assembly of claim 10, wherein the two sidewalls are connected by an angled wall that extends between the two sidewalls, and wherein the angled wall has a rounded non-symmetrical shape.

12. The coolant control ball valve assembly of claim 11, wherein the angled wall, the two sidewalls, and a bottom portion of the bearing block define a second channel of the flow diverter.

13. The coolant control ball valve assembly of claim 12, wherein the second channel of the flow diverter is configured to direct fluid at the expansion element.

14. The coolant control ball valve assembly of claim 11, wherein the angled wall and the two sidewalls comprise a lip that extends near the valve element.

15. The coolant control ball valve assembly of claim 7, wherein linear translation of the actuator assembly results in rotational translation of the valve element.

16. A coolant control ball valve assembly, comprising:
a housing comprising a housing chamber;
a channel, a first port, and a second port extending from the housing, wherein the channel extends through a lower portion of the housing;
a valve element positioned within the housing chamber;
an expansion element; and
a flow diverter positioned under the valve element and facing the expansion element, wherein the flow diverter extends past a bottommost portion of the channel,
wherein the flow diverter increases a velocity of coolant around the expansion element.

17. The coolant control ball valve assembly of claim 16, wherein the flow diverter comprises two sidewalls extending downwardly from a bearing block positioned between the expansion element and the valve element.

18. The coolant control ball valve assembly of claim 17, wherein one of the two sidewalls extends farther downward than the other sidewall.

19. The coolant control ball valve assembly of claim 16, wherein the channel and the first port are integrally molded with the housing and the second port is fastened to the housing.

* * * * *